United States Patent [19]
LaPointe et al.

[11] Patent Number: 5,931,529
[45] Date of Patent: Aug. 3, 1999

[54] APPARATUS FOR SECURING INDEPENDENT SECTIONS OF A MODULAR SEATING ASSEMBLY

[75] Inventors: Larry P. LaPointe, Temperance; Richard E. Marshall, Monroe, both of Mich.

[73] Assignee: La-Z-Boy Incorporated, Monroe, Mich.

[21] Appl. No.: 08/907,464

[22] Filed: Aug. 8, 1997

[51] Int. Cl.$^6$ .................................................. A47C 17/00
[52] U.S. Cl. ............................................ 297/248; 403/319
[58] Field of Search ............................ 297/248; 403/315, 403/316, 319

[56] References Cited

U.S. PATENT DOCUMENTS

| | | |
|---|---|---|
| 3,127,218 | 3/1964 | Banke . |
| 3,227,487 | 1/1966 | Blanchard, Jr. et al. . |
| 3,614,157 | 10/1971 | Hendrickson et al. . |
| 3,620,567 | 11/1971 | Hendrickson et al. . |
| 4,311,337 | 1/1982 | Brunn . |
| 5,129,703 | 7/1992 | Ballendat et al. . |
| 5,234,253 | 8/1993 | LaPointe et al. . |
| 5,314,234 | 5/1994 | England . |
| 5,338,096 | 8/1994 | Huang ............................ 297/440.22 X |
| 5,352,017 | 10/1994 | Berning ................................... 297/248 |
| 5,443,239 | 8/1995 | Laporte ............................ 297/440.2 X |
| 5,518,298 | 5/1996 | LaPointe et al. . |
| 5,520,437 | 5/1996 | LaPointe et al. . |
| 5,544,938 | 8/1996 | Saul et al. .............................. 297/248 |
| 5,630,644 | 5/1997 | LaPointe et al. ....................... 297/248 |

FOREIGN PATENT DOCUMENTS

| | | | |
|---|---|---|---|
| 2103476 | 2/1983 | United Kingdom | ................... 297/248 |
| 2 127 367 | 4/1984 | United Kingdom . | |

*Primary Examiner*—Peter R. Brown
*Attorney, Agent, or Firm*—Harness, Dickey & Pierce, P.L.C.

[57] ABSTRACT

A bracket assembly for securing at least a first seating section and a second seating section to form a modular seating assembly is provided. The bracket assembly includes a pair of laterally extending studs mounted to the first seating section, and a pair of brackets mounted to the second seating section including a vertical member for engaging the pair of laterally extending studs. The pair of brackets include a first bracket having a receiving portion and a retaining mechanism for releasably securing one of the laterally extending studs, and a second bracket having a receiving portion for engaging the other one of the laterally extending studs.

25 Claims, 6 Drawing Sheets

APPARATUS FOR SECURING INDEPENDENT SECTIONS OF A MODULAR SEATING ASSEMBLY

BACKGROUND OF THE INVENTION

1. Technical Field

The present invention relates to securing modular furniture and, more particularly, to a bracket apparatus for releasably securing a plurality of independent seating sections together in a modular side-by-side configuration to form a loveseat, sofa or other modular seating assembly.

2. Discussion

Present day sofas now often incorporate one or more reclining seating sections which provide a significant degree of added comfort when compared with many conventional sofas. Such modular sofa assemblies incorporating one or more reclining seating sections enable the owner to "customize" a sofa assembly to fit her/his specific needs and lifestyle. With the sofa assemblies just described, it has heretofore been necessary to secure the recliner section(s) with the remaining seating section(s) via a permanent frame, usually constructed integrally with the various seating sections at the factory. Accordingly, when the sofa assembly is shipped it must be shipped as one single, relatively large structure.

One solution to this problem was to secure the modular seating sections to a pair of transverse frame rails after delivery. As such, the modular components could be individually shipped. An example of this system is that disclosed in the commonly assigned U.S. Pat. No. 5,234,253, the disclosure of which is expressly incorporated herein by reference.

The advantage of such a frame-like mounting apparatus as described in the above-referenced U.S. Patent is the flexibility in changing the configuration of the sofa assembly as the needs of the owner change. For example, if the sofa assembly was originally purchased with three sections, the owner could at a later time eliminate the center section and reinstall the two other sections on shorter frame rails to achieve a loveseat configuration. Accordingly, there would be no need for the owner to order an entire new sofa assembly comprising only two sections if the owner desired to utilize the sofa in a location with space restrictions or for other reasons. However, this system can limit the possible configurations of the modular sections, especially if the use of a corner seating section or wedge is desired.

Another solution to this problem was to secure the modular seating sections with various key-hole type brackets after delivery. This system also allows for the modular components to be individually shipped. However, one problem with this key-hole type bracket system is that one seating section must be lifted and aligned with the other seating section, and then lowered into place for properly engaging the key-hole brackets. An example of this system is that disclosed in the commonly assigned U.S. Pat. No. 5,544,938, the disclosure of which is expressly incorporated herein by reference.

While the frame rail and key-hole bracket systems have proved to provide good structural strength to the sofa assembly, it is desirable to provide a simple bracket apparatus for releasably securing the independent sections of the modular seating assembly together, which eliminates the need for lifting the seating sections. Each independent seating section can be fitted with the appropriate bracket member for allowing the seating sections to be interconnected. Such a bracket apparatus would increase the possible configurations of the modular sections. This would also facilitate the shipping of such seating assemblies, as the various components could be shipped independently and interconnected after delivery.

Upon delivery to the destination, the ability to individually handle the modular components of the seating assembly would contribute to much easier handling of the seating assembly when moving it, for example, within hallways and through doorways of rooms in a home, apartment or even an office. The ability to transport individual sections of the seating assembly, allows the entire seating assembly to be easily moved through such areas where the completely assembled sofa might be too large and cumbersome to handle or transport.

In addition, it is often desirable to include multiple reclining seating sections in a seating assembly. The added weight of these recliner units would make a conventional seating unit heavy and difficult to handle and transport. Alternatively, the individual reclining seating units are easily handled and transported if detached from the seating assembly.

It is further desirable if the bracket apparatus described above includes means for enabling the modular sections of the sofa assembly to be laterally adjusted to compensate for slightly varying thicknesses of fabric and padding. The need for allowing some adjustability in a coupling or bracket apparatus as described above is particularly important when one or more recliner chair sections are included to form the modular seating assembly. The recliner sections must be able to recline freely with a minimum amount of friction from adjacent stationary or moveable seating sections. Additionally, the clearance between the recliner sections and other sections of the seating assembly must not be so great as to allow unnecessary gap clearance between adjacent sections of the seating assembly.

It is therefore a principal object of the present invention to provide a bracket apparatus for a modular seating assembly which may be secured to the various seating sections of the assembly at the factory, or at the destination where the sofa assembly is to be installed.

It is still a further object of the present invention to provide a bracket apparatus which may be secured to each of the various sections of the modular sofa assembly for interconnecting the adjacent seating sections to each other.

It is yet another object of the present invention to provide a bracket apparatus which incorporates means for adjustably positioning adjacent seating sections of a modular sofa assembly to thereby compensate for varying thicknesses in fabric, cushioning, etc. of the various seating sections.

It is still another object of the present invention to provide a universal bracket apparatus for a modular sofa assembly which enables a particular seating section, for example, a fixed seating section, to be detached from the apparatus and substituted with another seating section, for example, a reclining seating section, without changing the bracket apparatus.

It is still another object of the present invention to provide a bracket apparatus which is very inexpensive to produce and which does not add appreciably to the overall complexity of the modular seating assembly.

SUMMARY OF THE INVENTION

The above and other objects are accomplished by a bracket apparatus in accordance with the preferred embodiments of the present invention. In one preferred embodiment of the bracket apparatus, a generally L-shaped bracket is provided having a vertical engaging member and a horizontal fastening member. The vertical engaging portion includes an engaging recess for receiving a similarly positioned retaining stud. At least one of the brackets includes a latching mechanism pivotably supported by the vertical engaging member. The horizontal fastening portion is particularly well suited to be secured to a frame rail of a recliner seating section in a manner that disposes the vertical engaging portion generally parallel to the side wall of the seating section. In another preferred embodiment, the horizontal fastening portion may be excluded and the vertical engaging member may be directly fastened to the seating section.

The preferred embodiments of the present invention provide a very cost effective yet simple to manufacture means by which one or more modular seating sections, whether they be fixed or recliner seating sections, can be quickly and easily secured together to form a modular seating assembly. The preferred embodiments further provide for adjustability between the spacing of the seating sections as well as allowing the seating sections to be quickly and easily uncoupled from one another. In this manner, the individual seating sections of a modular seating assembly may be quickly and easily coupled to one another by relatively unskilled personnel, such as when the seating assembly is delivered to a home, office, etc. The preferred embodiments of the present invention further enable the individual seating sections of a modular seating assembly to be quickly and easily detached from one another if the seating assembly is to be moved.

It will be appreciated, then, that the preferred embodiments disclosed herein provide a significant advantage in that the seating assembly may be much more easily shipped and handled than if the assembly was secured together at a factory, warehouse, or dealership. The preferred embodiments further do not require any special tools to enable the bracket members to be secured and released with each other for configuring the modular seating assembly.

BRIEF DESCRIPTION OF THE DRAWINGS

The various advantages of the present invention will become apparent to one skilled in the art by reading the following specification and appended claims and by referencing the following drawings in which:

DETAILED DESCRIPTION OF THE PREFERRED EMBODIMENTS

In accordance with the teachings of the present invention, a bracket apparatus particularly well suited for removably securing a plurality of seating sections together to form a modular seating assembly is disclosed. It should be understood from the outset that the bracket apparatus of the present invention is readily adaptable to any number of seating units including those disclosed in the commonly assigned U.S. Pat. No. 5,141,284, U.S. Pat. No. 5,234,253 and U.S. Pat. No. 5,292,170, the disclosures of which are hereby expressly incorporated herein by reference.

Figure 1:
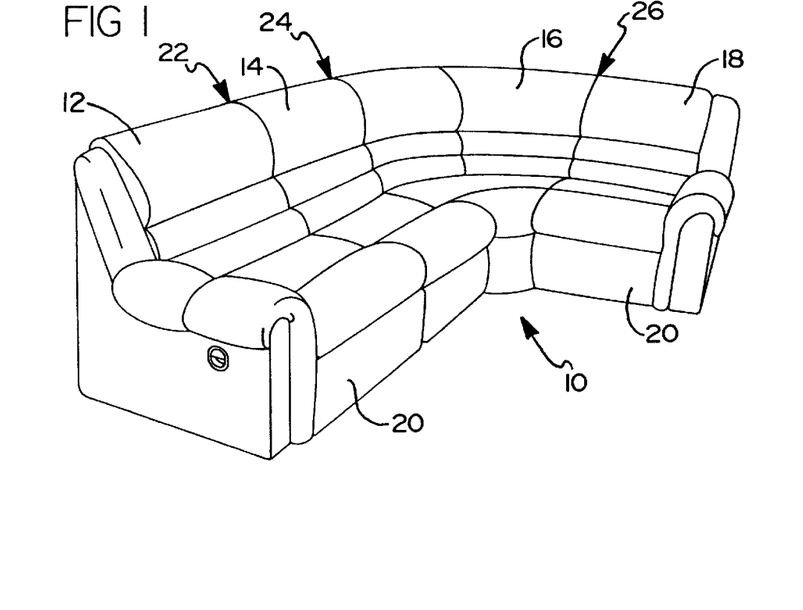
FIG. 1 is a perspective view of a modular seating assembly in the form of a modular sofa showing a corner section, a fixed seating section releasably secured to the left side of the corner section, a recliner seating section on the right side of the corner section, and another recliner seating section releasably secured to the left side of the fixed seating section.

Referring now to FIG. 1, the brackets in accordance with the first and second preferred embodiments of the present invention are disclosed in conjunction with modular seating assembly 10. As will be appreciated, modular seating assembly 10 includes a left recliner seating section 12, a fixed seating section 14, a corner seating section 16, and a right recliner seating section 18. It should be understood that the plurality of independent seating sections 12, 14, 16, and 18 are modular seating sections, with seating sections 12 and 18 being of the recliner type and having recliner mechanisms like that disclosed in U.S. Ser. No. 08/855,031, filed May 13, 1997, entitled Wall Proximity Reclining Chair, which is commonly assigned, and the disclosure of which is expressly incorporated herein by reference. However, one skilled in the art will appreciate that the brackets of the present invention can be used for securing many styles of modular seating sections.

Left and right recliner seating sections 12, 18 both include a leg rest panel 20 which can be extended when the seating section is placed into the reclined position. The brackets associated with the present invention are utilized in between the abutting surfaces of each independent seating section. More particularly, a first set of brackets are disposed between left recliner seating section 12 and fixed seating section 14 forming interface 22. A second set of brackets are disposed between fixed seating section 14 and corner seating section 16 forming interface 24. Finally, a third set of brackets are disposed between corner section 16 and right recliner seating section 18 forming interface 26. Accordingly, the brackets of the present invention permit the universal interconnection of any number of independent seating sections 12, 14, 16, and 18, in addition to several other types of independent or modular seating sections (not shown).

Figure 2:
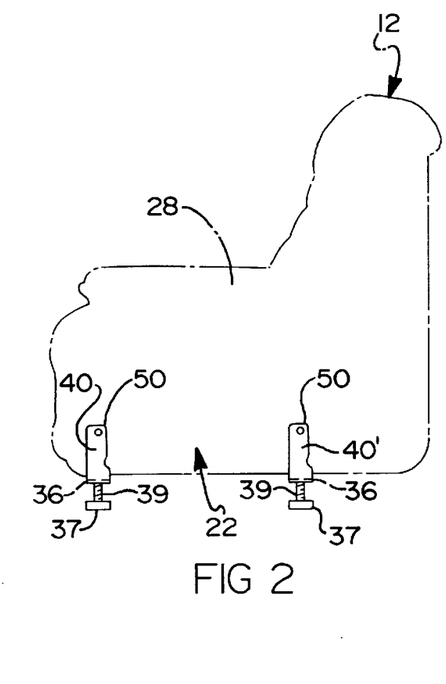
FIG. 2 is an elevational view of the right side of the recliner seating section positioned at the left end of the modular seating assembly.

FIG. 2 illustrates the right surface 28 of left recliner section 12. As disclosed, right surface 28 includes a pair of L-shaped stud brackets 40, 40' which are securely fastened to front and rear frame rails 36. A set of glides 37 are also secured to the frame rails 36 at each corner. Each glide 37 (two shown) includes a threaded shaft 39 which is threaded into an aperture formed in the frame rails 56. Accordingly, each glide 37 can be rotated for changing the vertical position of the glide and adjusting the height of the frame rails 36. As disclosed, stud bracket 40 is mounted at a forward portion of right surface 28, and stud bracket 40' is mounted at a rearward portion thereof. Each stud bracket 40 includes a laterally extending stud 50 having a head portion 52 at its outboard end. Preferably, each stud 50 is a threaded stud. Accordingly, the lateral position of head portion 52 can be adjusted in or out by selectively rotating each threaded stud 50. It should be understood that interface 22 between seating sections 12 and 14 is formed by abutting right surface 28 with left surface 30.

Figure 3:
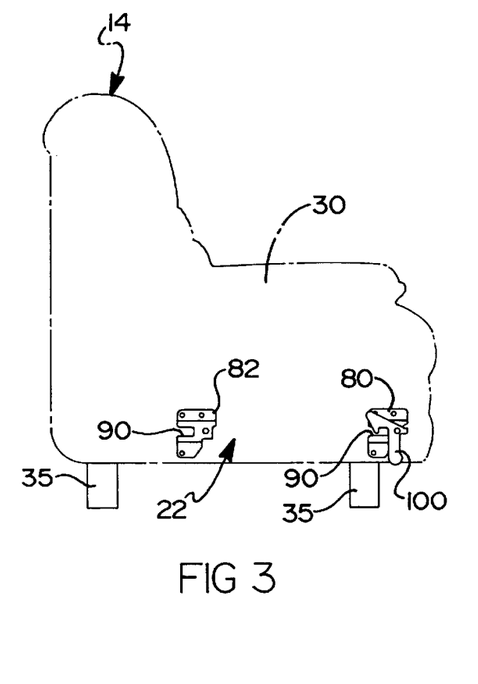
FIG. 3 is an elevational view of the left side of the fixed seating section showing the brackets associated with the second preferred embodiment of the present invention.

FIG. 3 illustrates the left surface 30 of fixed seating section 14. Left surface 30 has a side mount latch bracket 80 secured at a forward portion, and a side mount receiving bracket 82 secured at a rearward portion. Fixed seating section 14 is supported by four adjustable legs 35. As will be appreciated, when right surface 28 is abutted with left surface 30, the studs 50 of each stud bracket 40, 40' can be engaged with their corresponding side mount latch bracket 80 and side mount receiving bracket 82 (respectively) for releasably securing left recliner section 12 with fixed seating section 14. As will be appreciated, latch 100 serves to retain stud 50 within receiving recess 90 for maintaining seating sections 12 and 14 in their proper alignment. Additionally, the distance between seating sections 12 and 14 can be adjusted by changing the position of each threaded stud 50.

Figure 4:
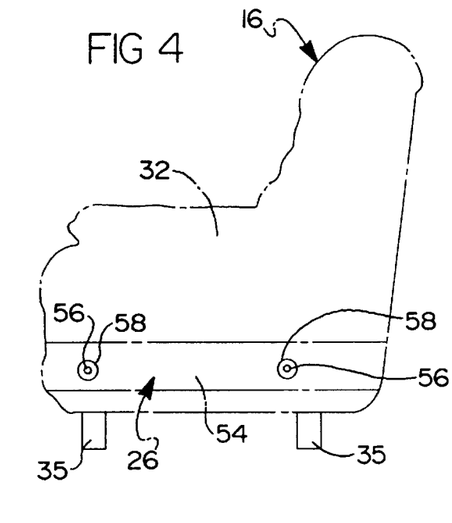
FIG. 4 is an elevational view of the right side of the corner section showing the retaining studs associated with an alternate preferred embodiment of the present invention.

FIG. 4 shows the right surface 32 of corner section 16 for accommodating one embodiment of the brackets associated with the present invention. Corner seating section 16 is also supported by four adjustable legs 35. Corner section 16 includes a wooden frame portion 54 running along its side. A threaded stud 56 is secured within a forward portion of wooden frame 54, and a threaded stud 56' is secured within a rearward portion of wooden frame 54. Each threaded stud 56, 56' extends laterally from wooden frame 54 and further includes a larger head portion 58 at its outboard end. The lateral position of head portion 58 can be adjusted in or out by selectively rotating threaded stud 56, 56'.

Figure 5:
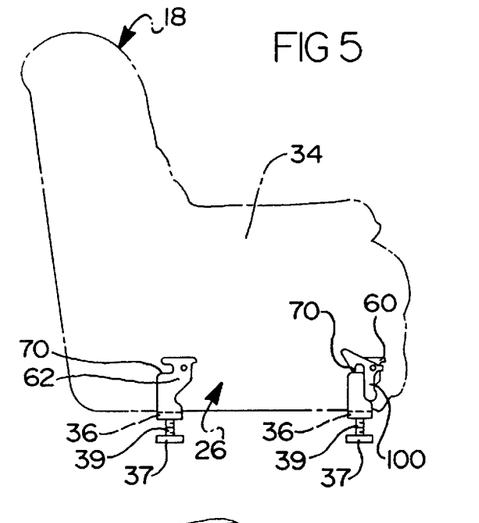
FIG. 5 is an elevational view of the left side of the recliner seating section on the right side of the modular seating assembly showing the brackets in accordance with the first preferred embodiment of the present invention.

FIG. 5 illustrates the left surface 34 of the right recliner seating section 18. Left surface 34 also includes an L-shaped latch bracket 60 secured at a forward portion, and an L-shaped receiving bracket 62 secured at a rearward portion. L-shaped brackets 60, 62 are secured to a pair of frame rails 36 associated with right recliner seating section 18. A set of glides 37 are also secured to the frame rails 36 at each corner. Each glide 37 (two shown) includes a threaded shaft 39 which is threaded into an aperture formed in the frame rails 56. Accordingly, each glide 37 can be rotated for changing the vertical position of the glide and adjusting the height of the frame rails 36. As described above with respect to FIGS. 2 and 3, when right surface 32 is abutted with left surface 34, thereby forming interface 26, the laterally extending studs 56, 56' can be engaged with L-shaped brackets 60, 62, respectively, for releasably securing corner seating section 16 with right recliner seating section 18 in a coupled fashion. Additionally, the distance between seating sections 16 and 18 can be adjusted by changing the position of studs 56, 56'. This feature is especially useful when thicker upholstery is used, or more stuffing provided in the adjacent seating sections. Accordingly, the recliner seating section 18 is able to freely recline by eliminating the frictional contact between adjacent seating sections. While not specifically shown, the interface 24 between fixed seating section 14 and corner seating section 16 could alternatively be formed by the interconnection of similar threaded studs 56, 56' and side mount brackets 80, 82 for releasably securing these seating sections for completing the modular seating assembly 10.

Figure 6:
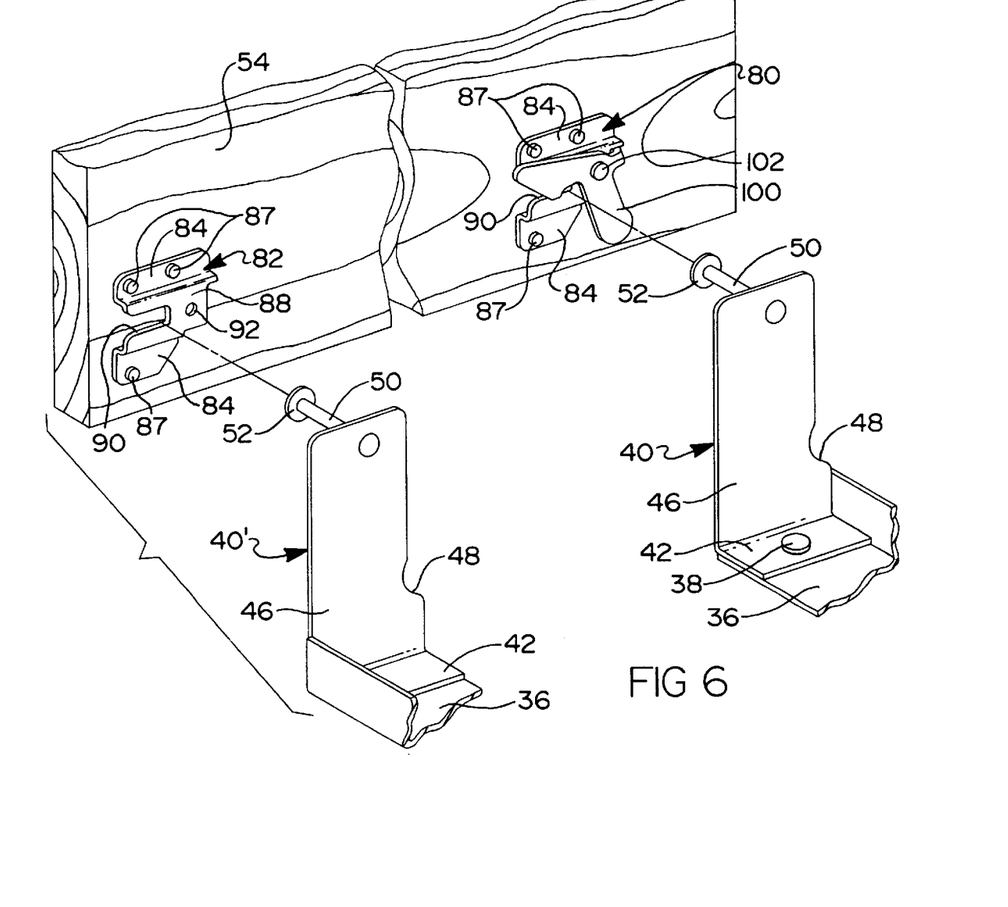
FIG. 6 is a perspective view of the brackets shown in FIGS. 2 and 3 in accordance with a second preferred embodiment of the present invention.

With reference now to FIG. 6, the interface 22 described with respect to FIGS. 2 and 3 is shown in more detail. More specifically, FIG. 6 illustrates the L-shaped stud brackets 40, 40' in alignment with side mount brackets 80,82 according to a second preferred embodiment of the present invention. FIG. 6 further illustrates that each L-shaped stud bracket 40, 40' is rigidly secured to frame rails 36 via suitable fasteners 38. One skilled in the art will readily appreciate that stud brackets 40, 40' are separated from each other by the same distance as side mount brackets 80, 82 to facilitate the precise alignment of each stud 50 within each receiving recess 90. As will also be appreciated, the vertical position of each stud 50 matches the vertical position of each receiving recess 90 (within acceptable design tolerances), also for facilitating the precise alignment between the modular seating sections 12, 14, 16 and 18 of modular seating assembly 10. This vertical alignment between stud 50 and receiving recess 90 can be adjusted by changing the positions of legs 35 and/or glides 37 as described above.

Figure 7:
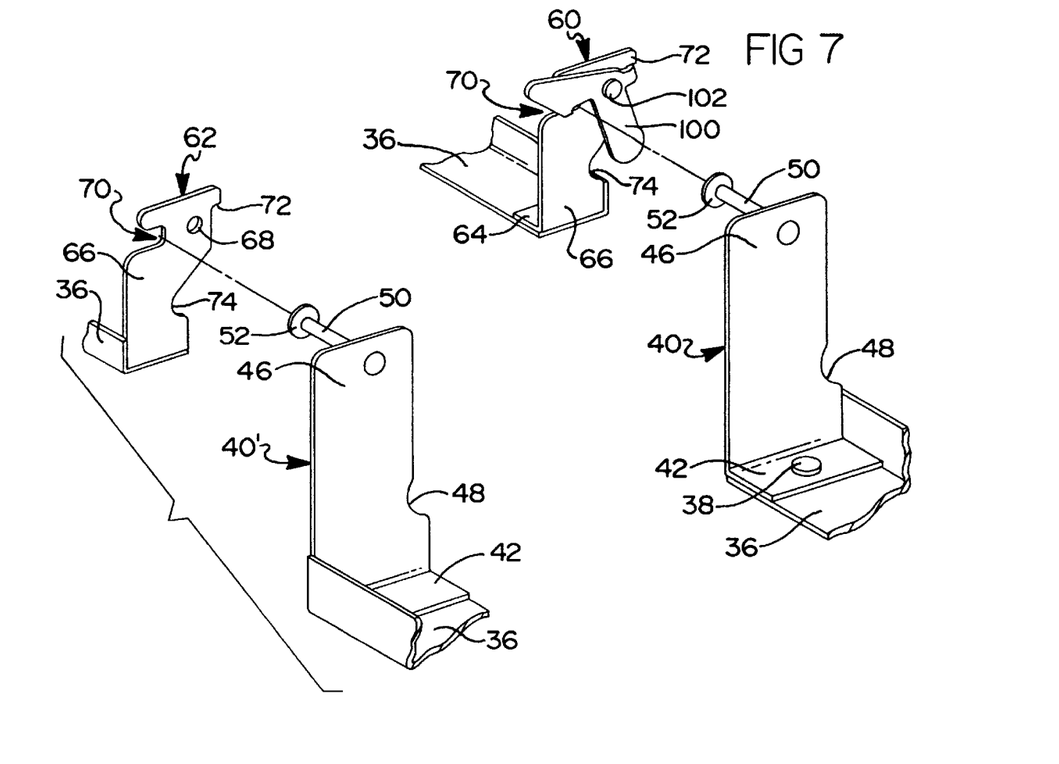
FIG. 7 is a perspective view of the brackets in accordance with a first preferred embodiment of the present invention.

Referring now to FIG. 7, the latching and receiving brackets forming interface 26 associated with a first preferred embodiment of the present invention are shown. FIG. 7 also illustrates the L-shaped stud brackets 40, 40' in alignment with L-shaped latch brackets 60, 62. As set forth above, each L-shaped stud bracket 40, 40' is rigidly secured to frame rails 36 via suitable fasteners 38. One skilled in the art will readily appreciate that stud brackets 40, 40' are separated from each other by the same distance as L-shaped latch brackets 60, 62 to facilitate the precise alignment of each laterally extending stud 50 within each receiving recess 70. As will also be appreciated, the vertical position of each stud 50 matches the vertical position of each receiving recess 70, also for facilitating the precise alignment between the modular seating sections of modular seating assembly 10. This vertical alignment between stud 50 and receiving recess 70 can be adjusted by changing the positions of legs 35 and/or glides 37 as described above.

Figure 8:
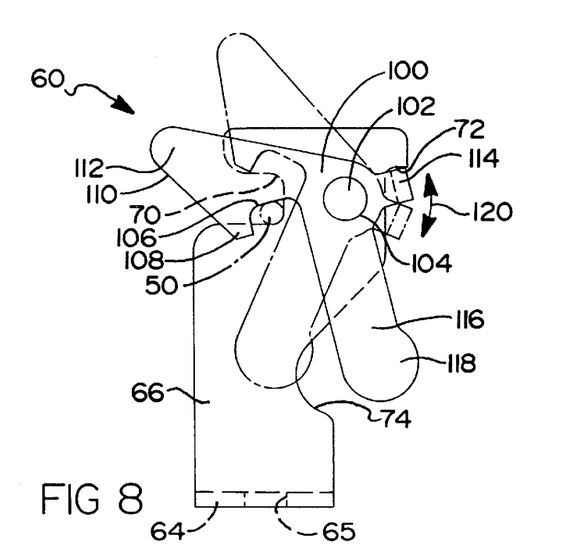
FIG. 8 is a side elevation view of the bracket according to the first preferred embodiment of the present invention.

FIG. 8 further discloses the details of the L-shaped latch bracket 60 according to the first preferred embodiment of the present invention. As shown, latch bracket 60 includes a horizontal flange 64 with a circular aperture 65 formed therein for securing the latch bracket 60 to a frame structure such as frame rail 36. Latch bracket 60 is further defined by vertical member 66 having various features associated therewith. More specifically, a circular aperture 68 is formed at the upper end of vertical member 66 for receiving a rivet 102 for pivotally supporting latch 100. A generally U-shaped recess 70 is formed at the rearward portion of vertical member 66 for receiving stud 50 of stud bracket 40 which is secured to the seating section opposite latch bracket 60. As will be appreciated, the diameter of head portion 52 is greater than the height of recess 70 to prevent the inadvertent disengagement of adjacent brackets. A mechanical stop 72 is formed at the forward portion of vertical member 66 for limiting the rotation of latch 100. Vertical member 66 also includes cutout portion 74 formed along its forward edge which provides a recessed area for fully depressing latch 100.

As will be appreciated, latch 100 is pivotably supported by a rivet 102 which extends through a circular aperture 104 formed through latch 100. Rivet 102 is then secured within circular aperture 68 formed in vertical member 66. Latch 100 is further defined by a recess 106 and a catch 108 which serves to encompass the stud 50 once placed into recess 70. The rearward portion of latch 100 includes an angled guide surface 110 which causes latch 100 to rotate about rivet 102 as stud 50 is placed within recess 70. The tip of latch 100 serves as a weighted mass 112 for counterbalancing latch 100 and imparting a gravity driven counterclockwise rotational bias. As such, when stud 50 is properly situated within recess 70, latch 100 will rotate counter clockwise (as viewed in FIG. 8) about rivet 102 such that recess 106 and catch 108 prevent stud 50 from exiting recess 70. Latch 100 further includes a tab 114 for engaging mechanical stop 72 for limiting the rotation of latch 100. Preferably, the clockwise rotation of latch 100 is achieved through movement of lever arm 116 having a rounded end 118. Arrow 120 illustrates the rotational movement of latch 100 about rivet 102.

As previously discussed, latch 100 is designed such that stud 50 can be automatically inserted and retained within recess 70. Once inserted, stud 50 may be released from recess 70 by rearwardly depressing rounded end 118 of lever 116 within cut-out portion 74 to rotate latch 100 clockwise about rivet 102 until catch 108 no longer blocks the removal of stud 50 from recess 70. Cut-out portion 74 allows rounded end 118 to be moved sufficiently forward for completely releasing stud 50. As rounded end 118 is moved within recess 74, the adjacent sections of furniture (such as seating sections 16 and 18) can be moved out of alignment so that stud 50 of bracket 40 can be disengaged from latch bracket 60, and stud 50 of bracket 40' can be disengaged from receiving bracket 62. In this manner, right recliner seating section 18 can be disengaged and moved away from corner seating section 16 for breaking apart modular seating assembly 10.

Figure 9:
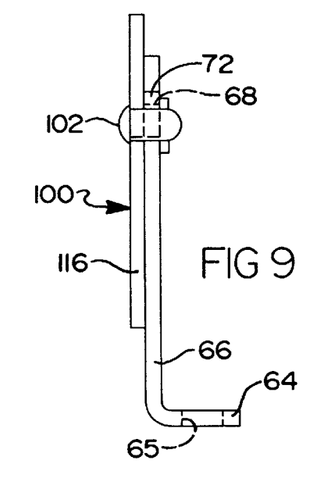
FIG. 9 is a front elevation view of the bracket shown in FIG. 8.
Figure 10:
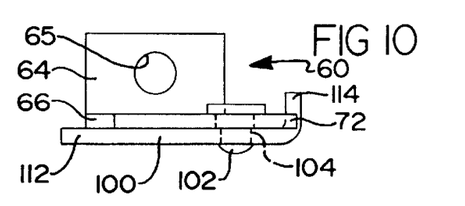
FIG. 10 is a top plan view of the bracket shown in FIG. 8.

FIG. 9 is a front elevational view of L-shaped latch bracket 60. As will be appreciated, horizontal flange 64 and vertical member 66 are disposed 900 from one another. Preferably, L-shaped latch bracket 60 and L-shaped receiving bracket 62 are stamped from a single metal blank thereby producing the necessary apertures and recesses. A subsequent stamping process then forms horizontal flange 64 in the requisite position. FIG. 9 further illustrates the proximity of latch 100 to vertical member 66, as well as the pivotal relationship therebetween. As best seen when viewing FIGS. 9 and 10, the tab portion 114 formed on latch 100 can be viewed from different perspectives. More specifically, tab 114 is disposed 90° from the primary portion of latch 100. The position of tab 114 with respect to mechanical stop 72 is also illustrated in FIG. 10. While it is preferred that latch 100 is rotated via lever arm 116, one skilled in the art will appreciate that tab 114 can be depressed using a blunt tool, such as a flat blade screwdriver, for appropriately rotating latch 100 for releasing stud 50. Also viewed in FIG. 10 is the aperture 65 formed within horizontal flange 64 which is utilized for securing L-shaped latch bracket 60, or alternatively, L-shaped receiving bracket 62, to the frame rail 36 of the recliner seating section 16, 18.

Figure 11:
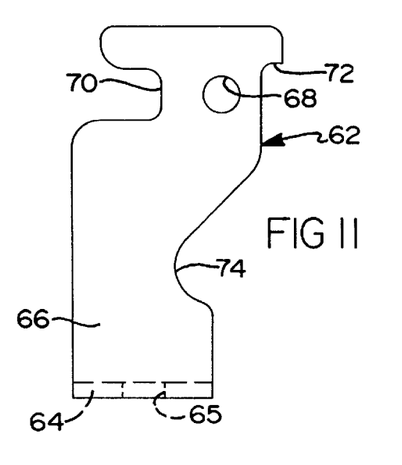
FIG. 11 is a side elevation view of the bracket according to the first preferred embodiment of the present invention.

Referring now to FIG. 11, the details associated with L-shaped receiving bracket 62 are disclosed. It should be understood that receiving bracket 62 is essentially identical to latch bracket 60 except that the latch 100 is excluded. As such, recess 70 of receiving bracket 62 serves to engage stud 50 primarily for preventing opposing lateral movement between the adjacent seating sections. Preferably, receiving bracket 62 is secured to the rear portion of each modular seating section to facilitate easy removal of adjoining sections. The absence of a latch 100 on receiving bracket 62 obviates the need to reach behind the rear portion of the sofa assembly 10, either by hand or with tools, to release the latch 100. Accordingly, receiving bracket 62 provides an adequate amount of engagement between adjacent seating sections, and the seating sections can be easily separated by releasing the latch 100 of forwardly positioned latch bracket 60.

Figure 12:
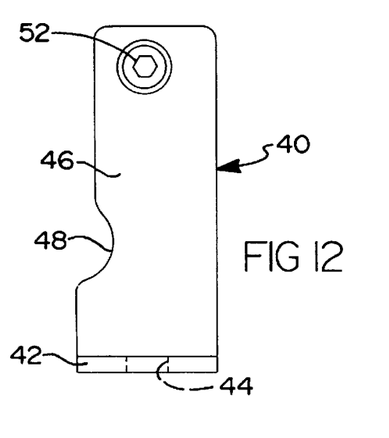
FIG. 12 is a side elevation view of the bracket also in accordance with a first preferred embodiment of the present invention.
Figure 13:
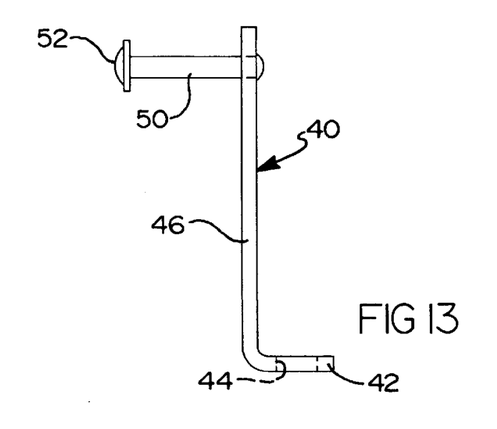
FIG. 13 is a front elevation view of the bracket shown in FIG. 12.
Figure 14:
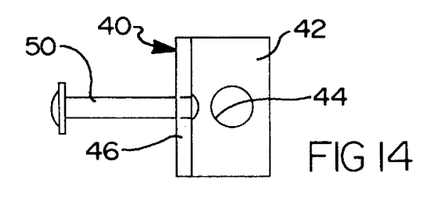
FIG. 14 is a top plan view of the bracket shown in FIG. 12.
Figure 15:
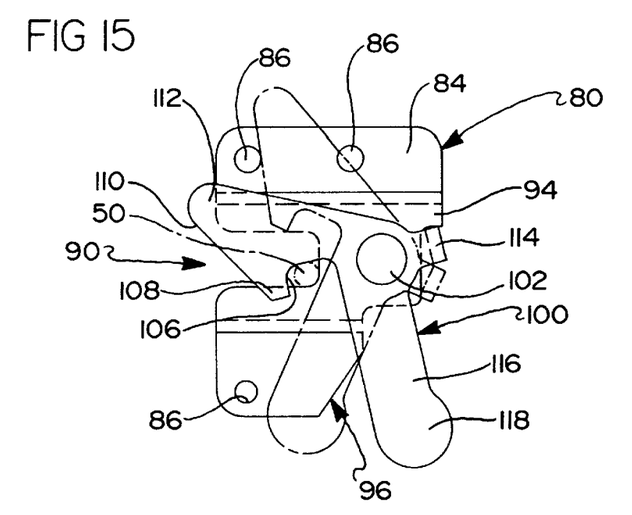
FIG. 15 is a side elevation view of the bracket in accordance with a second preferred embodiment of the present invention.
Figure 16:
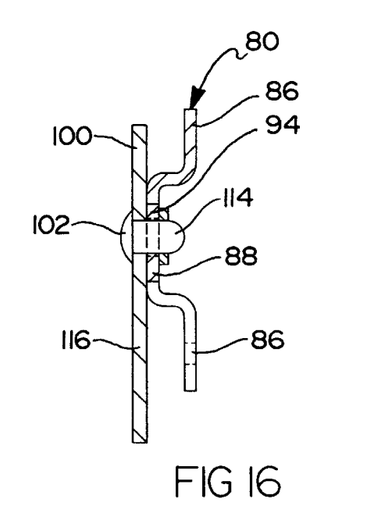
FIG. 16 is a front elevation view of the bracket shown in FIG. 15.
Figure 17:
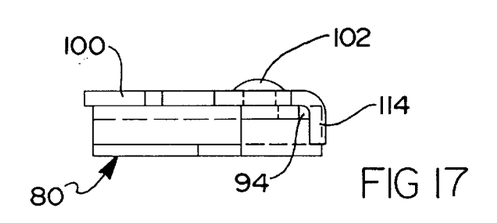
FIG. 17 is a top plan view of the bracket shown in FIG. 15.
Figure 18:
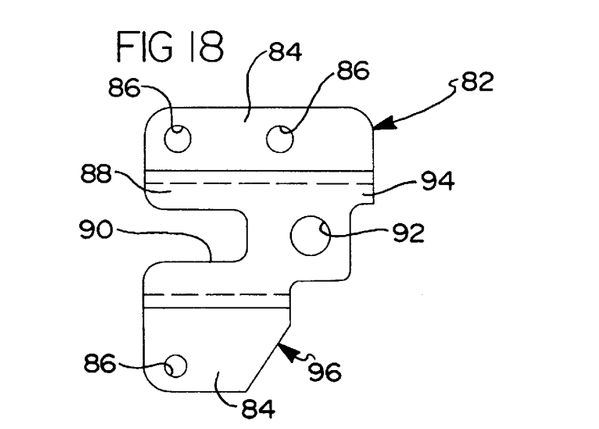
FIG. 18 is a side elevation view of the bracket in accordance with a second preferred embodiment of the present invention.

Turning now to FIGS. 12–14, the details associated with L-shaped stud brackets 40 or 40' are disclosed. As seen in these three views, each stud bracket 40 is defined by a horizontal flange 42 having a circular aperture 44 formed therein. The vertical member 46 of stud bracket 40 supports a laterally extending stud 50 having an enlarged head 52. The vertical member 46 includes a cut-out portion 48 along a mid-section of its forward edge. Preferably, stud 50 is secured within a threaded aperture formed within vertical member 46. This feature allows the lateral position of head 52 to be changed by rotating the threaded shaft of stud 50. However, stud 50 may also be welded to vertical member 46 or pressed within an aperture formed in vertical member 46. As will be appreciated from reviewing the drawings, L-shaped stud brackets 40, 40' are preferably mounted to the end portions of frame rails 36 along the right side of a recliner seating section such as right surface 28 of left recliner seating section 12. In a similar fashion, the modular bracket system is completed by securing either L-shaped brackets 60, 62 or side-mount brackets 80, 82 along the left surface 34 of right recliner seating section 18, or left surface 30 of fixed seating section 14, to oppose L-shaped stud brackets 40, 40', and coupling the stud brackets 40, 40' to the appropriate receiving and latch brackets.

Referring now to FIGS. 15–18, the side mount brackets according to a second preferred embodiment of the present invention are disclosed in more detail. More particularly, side mount brackets include side mount latch bracket 80 illustrated in FIGS. 15–17 and side mount receiving bracket 82 illustrated in FIG. 18. Each side mount bracket 80, 82 includes a mounting portion 84 for flushly securing each bracket 80,82 against wooden frame 54. A plurality of apertures 86 are provided through mounting portion 84 for securing each mounting bracket 80, 82 using suitable fasteners 87. Each side mount bracket 80, 82 further includes an offset receiving portion 88 having a generally U-shaped receiving recess 90 opening along its rearward edge. As will be appreciated, the height of recess 90 is smaller than the diameter of head portion 52 for preventing the inadvertent disengagement of adjacent brackets. A circular aperture 92 is also provided for pivotally supporting latch 100 in a similar manner described above. Each latch bracket 80, 82 also has a stop portion 94 for interacting with tab portion 114 if latch 100 is installed. The latch brackets 80, 82 also include a cut-out portion 96 which allows lever arm 116 and rounded end 118 to be moved rearwardly for releasing stud 50 from receiving recess 90 in the fashion described above. As will be appreciated by one skilled in the art, side mount latch bracket 80 is substantially similar to side mount receiving bracket 82 except for the addition of latch 100 which is also pivotally supported by rivet 102 secured within aperture 92.

Figure 19:
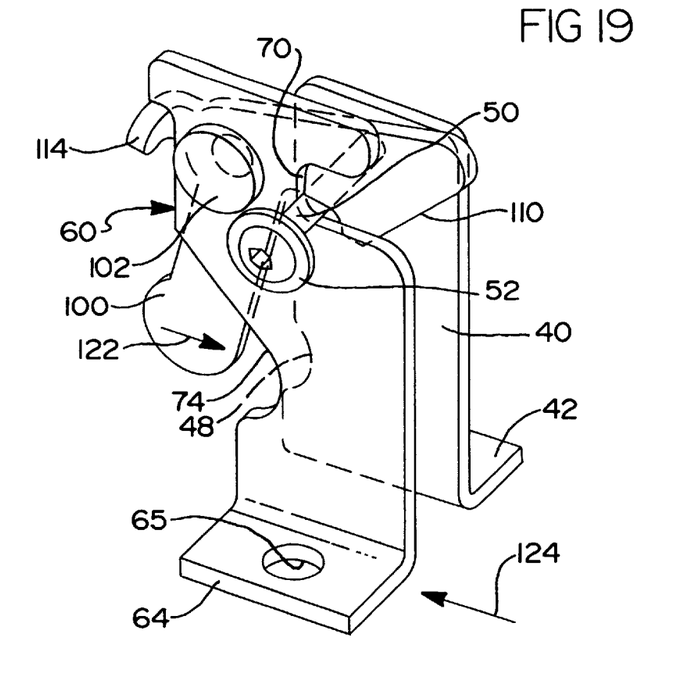
FIG. 19 is a perspective view of the brackets according to the first preferred embodiment shown in the engage position.

With reference now to FIG. 19, a perspective view of L-shaped latch bracket 60 engaged with L-shaped stud bracket 40 according to a first preferred embodiment of the present invention is shown. The following operational example assumes that stud bracket 40 is secured to the section of furniture which is to remain stationary, and L-shaped latch bracket 60 is secured to a section of furniture which is moveable in a sliding fashion. To form the coupled assembly shown in FIG. 19, latch bracket 60 is positioned forward of stud bracket 40 (not specifically shown) in such a fashion that vertical member 66 and latch 100 are disposed and aligned between the parallel vertical planes defined by vertical member 46 and head portion 52. The modular seating section to which latch bracket 60 is secured is then slid rearwardly so that stud 50 engages angled guide portion 110 for rotating latch 100 and engaging receiving recess 70. Once stud 50 completely engages receiving recess 70, latch 100 rotates back in an opposite direction via gravity so that recess 106 and catch 108 encompass stud 50 for maintaining latch bracket 60 in a substantially locked position.

Removal of stud 50 from receiving recess 70 is accomplished by placing rearward pressure in the direction of arrow 122 against lever arm 116 for appropriately rotating latch 100 so that recess 106 and catch 108 release from stud 50. This can be accomplished with the fingertip of the individual, or with appropriate tools. The modular seating section and latch bracket 60 are then slid in the direction of arrow 124 for completely disengaging stud 50 from receiving recess 70. Of particular interest in FIG. 19 is the alignment of cut-out portion 48 and cut-out portion 74 which allow for the complete depression of rounded end 118 for fully disengaging latch 100 from stud 50.

Figure 20:
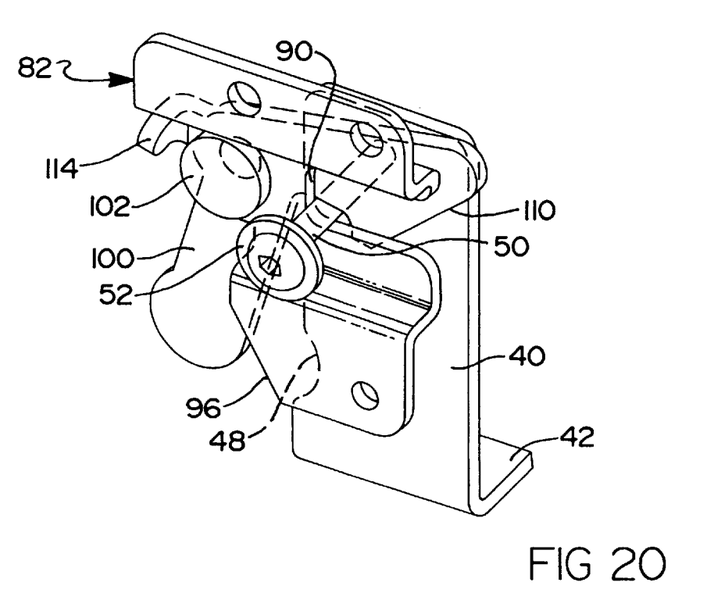
FIG. 20 is a perspective view of the brackets according to the second preferred embodiment, also shown in the engaged position.

With reference to FIG. 20, a perspective view of side mount latch bracket 80 engaged with L-shaped stud bracket 40 according to a second preferred embodiment of the present invention is illustrated. It should be understood that while side mount latch bracket 80 utilizes a slightly different configuration than that of L-shaped latch bracket 60, latch bracket 80 operates in a substantially similar fashion for engaging stud 50 which is supported by stud bracket 40. Also of particular interest in FIG. 20 is the alignment of cut-out portion 48 with cut-out portion 96 which also facilitates the complete depression of rounded end 118 for fully disengaging latch 100 from stud 50. Accordingly, side mount latch bracket 80 can be engaged and disengaged with stud bracket 40 as previously described above.

The foregoing discussion discloses and describes exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A bracket assembly for securing at least a first seating section and a second seating section to form a modular seating assembly, said bracket assembly comprising:

a pair of laterally extending studs mounted to the first seating section;

a pair of brackets mounted to the second seating section including a vertical member for engaging the pair of laterally extending studs;

said pair of brackets including a first bracket having a receiving portion formed in the vertical member and a retaining mechanism pivotally mounted on the vertical member for releasably securing one of the laterally extending studs, and a second bracket having a receiving portion formed in the vertical member for engaging the other one of the laterally extending studs, said receiving portion having a vertical dimension which is greater than the diameter of the studs;

said retaining mechanism including a tab extending normally from the retaining mechanism, said tab positioned for engaging a surface of the vertical member distal to the receiving portion for limiting the rotational movement of the retaining mechanism.

2. The bracket assembly of claim 1 wherein the receiving portion is a rectangular channel formed in the vertical member.

3. The bracket assembly of claim 1 wherein the retaining mechanism is a latch mechanism pivotally supported by the vertical member of the first bracket.

4. The bracket assembly of claim 3 wherein the latch mechanism includes a recessed portion and a catch portion for encompassing one of the studs.

5. The bracket assembly of claim 4 wherein the latch mechanism further includes a lever arm for assisting in releasing the latch mechanism, and a weighted mass opposing the lever arm for assisting in engaging the latch mechanism.

6. The bracket assembly of claim 1 including a pair of L-shaped stud brackets, each stud bracket having a vertical member for supporting one of said studs, and a horizontal member for securing the bracket to a frame member of the first seating section.

7. The bracket assembly of claim 1 wherein the stud includes an enlarged head portion having a diameter which is greater than the vertical dimension of the receiving portion.

8. The bracket assembly of claim 7 wherein the stud includes a threaded shaft, and wherein the threaded shaft may be selectively rotated for changing the lateral position of the enlarged head portion for adjusting the distance between the first seating section and the second seating section.

9. The bracket assembly of claim 1 wherein the pair of laterally extending studs are secured to a lateral frame member of the first seating section.

10. The bracket assembly of claim 1 wherein the first and second brackets include a horizontal member disposed at the lower end of the vertical member thereby forming an L-shaped bracket, said horizontal member for securing the first and second brackets to a frame member of the second seating section.

11. The bracket assembly of claim 1 including a glide member for contacting a support surface, said glide member having a threaded shaft for threadingly engaging a frame member of the modular seating assembly, wherein the glide member may be selectively rotated for adjusting the vertical position of the frame member above the support surface.

12. A modular seating assembly comprising:

a first seating section;

a second seating section;

a pair of laterally extending studs mounted to the first seating section;

a pair of brackets mounted to the second seating section for coupling with the pair of laterally extending studs;

each of said brackets having a vertical member with a rectangular channel formed therein for receiving one of said studs, one of said brackets having a latch mechanism pivotally supported on the vertical member for releasably securing one of said studs, said latch mechanism including a tab formed thereon which wraps around and extends beyond the vertical member, said tab engaging a mechanical stop formed on the vertical member, and engaging a surface of the vertical member for limiting a range of rotational movement of the latch mechanism;

whereby the latch mechanism may be rotated for engaging and releasing one of said studs.

13. The modular seating assembly of claim 12 wherein the latch mechanism includes a recessed portion and a catch portion for encompassing the stud.

14. The modular seating assembly of claim 13 wherein the latch mechanism further includes a lever arm for assisting in releasing the latch mechanism, and a weighted mass opposing the lever arm for assisting in engaging the latch mechanism.

15. The modular seating assembly of claim 12 including a pair of L-shaped brackets, each bracket having a vertical member for supporting one of said studs, and a horizontal member for securing the bracket to the first seating section.

16. The modular seating assembly of claim 12 wherein the pair of laterally extending studs are secured to a lateral frame member of the first seating section.

17. The modular seating assembly of claim 12 including a glide member for contacting a support surface, said glide member having a threaded shaft for threadingly engaging a frame member of the modular seating assembly, wherein the glide member may be selectively rotated for adjusting the vertical position of the frame member above the support surface.

18. A coupling apparatus for securing a first seating section with a second seating section comprising:

a laterally extending stud member mounted on the first seating section;

a bracket member mounted on the second seating section and disposed adjacent to the stud member, said bracket member including a vertical member having a receiving portion for engaging the stud member; and a retaining mechanism pivotally mounted on the bracket member for releasably securing the stud member, the retaining mechanism including a tab formed thereon, said tab being operably associated with a surface of the bracket member distal to the receiving portion for limiting the rotational movement of the retaining mechanism.

19. The coupling apparatus of claim 18 wherein the stud member includes an enlarged head portion.

20. The coupling apparatus of claim 18 further including an L-shaped stud bracket having a vertical member for supporting the stud member, and a horizontal member for securing-the bracket to a modular seating section.

21. The coupling apparatus of claim 20 wherein the stud member includes a threaded shaft, and wherein the threaded shaft may be selectively rotated for changing the lateral position of the enlarged head portion for adjusting the distance between the bracket member and the L-shaped stud bracket.

22. The coupling apparatus of claim 20 wherein the retaining mechanism includes a recessed portion and a catch portion for encompassing the stud member.

23. The coupling apparatus of claim 22 wherein the retaining mechanism further includes a lever arm for assisting in releasing the retaining mechanism, and a weighted mass opposing the lever arm for assisting in engaging the retaining mechanism.

24. The coupling apparatus of claim 23 wherein the bracket member and the L-shaped stud bracket include a cutout for allowing the retaining mechanism to be fully released.

25. The coupling apparatus of claim 18 wherein the vertical member includes a plurality of apertures for securing the bracket member to a modular seating section.

* * * * *